US010275632B2

(12) United States Patent
Chen et al.

(10) Patent No.: US 10,275,632 B2
(45) Date of Patent: Apr. 30, 2019

(54) DISPLAY APPARATUS WITH FINGERPRINT IDENTIFICATION FUNCTION

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Chun-Chi Chen, Hsinchu (TW); Shang-Yu Huang, Hsinchu (TW); Chen-You Chen, Hsinchu (TW); Shih-Yu Wang, Hsinchu (TW)

(73) Assignees: INTERFACE OPTOELECTRONIC (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 173 days.

(21) Appl. No.: 15/224,653

(22) Filed: Jul. 31, 2016

(65) Prior Publication Data

US 2017/0061190 A1    Mar. 2, 2017

(30) Foreign Application Priority Data

Aug. 25, 2015    (CN) .......................... 2015 1 0524803

(51) Int. Cl.
*G06K 9/00*    (2006.01)
*G02F 1/1362*    (2006.01)
(Continued)

(52) U.S. Cl.
CPC ....... *G06K 9/0002* (2013.01); *G02F 1/13338* (2013.01)

(58) Field of Classification Search
CPC ...... G06F 3/0412; G06F 3/0416; G06F 3/043; G06F 3/0436; G06F 3/044; G06K 9/0002; G02F 2001/134318; G02F 2001/134381; H01L 41/31; H01L 51/5228; H01L 27/3244; H01L 27/3248
See application file for complete search history.

(56) References Cited

U.S. PATENT DOCUMENTS

| 2005/0151065 A1* | 7/2005 | Min ..................... G09G 3/3406 |
| | | 250/214 R |
| 2008/0122999 A1* | 5/2008 | Tsuchiya ............... G02F 1/1395 |
| | | 349/33 |

(Continued)

*Primary Examiner* — Kim Y Vu
*Assistant Examiner* — Michael J Vanchy, Jr.
(74) *Attorney, Agent, or Firm* — ScienBiziP, P.C.

(57) ABSTRACT

A display apparatus which is also able to receive and identify fingerprints comprises a first substrate, a second substrate, a liquid crystal layer, a plurality of dummy pixel units located in a non-display region, a fingerprint identification module, and a plurality of data extending lines. Each of the dummy units comprises first and second auxiliary electrodes. The fingerprint identification module comprises signal transmitting layer and signal receiving components on the signal transmitting layer. The signal receiving component receives reflected ultrasonic wave and converts the received waves into fingerprint signal. The data extending line is electrically connected with the dummy pixel unit. The signal receiving component transmits the fingerprint signals to the at least one first auxiliary electrode and the data extending line thus receives the fingerprint signal.

10 Claims, 13 Drawing Sheets

(51) Int. Cl.
  *G02F 1/1335* (2006.01)
  *G02F 1/1368* (2006.01)
  *G02F 1/1333* (2006.01)
  *G02F 1/1343* (2006.01)
  *G02F 1/133* (2006.01)

(56) References Cited

U.S. PATENT DOCUMENTS

2008/0309233 A1* 12/2008 Hasegawa ........... H01L 27/3244
  313/505
2010/0156851 A1* 6/2010 Kurokawa ............ G06F 3/0412
  345/175
2011/0057186 A1* 3/2011 Yamazaki ........... H01L 27/1225
  257/43
2015/0169136 A1* 6/2015 Ganti .................... B06B 1/0666
  345/177
2015/0254491 A1* 9/2015 Mo ....................... G06F 3/0416
  345/174

* cited by examiner

DISPLAY APPARATUS WITH FINGERPRINT IDENTIFICATION FUNCTION

CROSS-REFERENCE TO RELATED APPLICATIONS

This application claims priority to Chinese Patent Application No. 201510524803.1 filed on Aug. 25, 2015, the contents of which are incorporated by reference herein.

FIELD

The subject matter herein generally relates to a multi-function display apparatus.

BACKGROUND

Fingerprint identification apparatus have been used for protecting personal information by improving security function. This has included using a plurality of sensing units. The sensing units form a fingerprint image based on scanning a fingertip. However, there is a better technique for acquiring the fingerprint id without sacrificing the quality of the display and the display performance, which further results in a more effective and more responsive fingerprint identification system.

BRIEF DESCRIPTION OF THE FIGURES

Implementations of the present technology will now be described, by way of example only, with reference to the attached figures.

DETAILED DESCRIPTION

Figure 1:
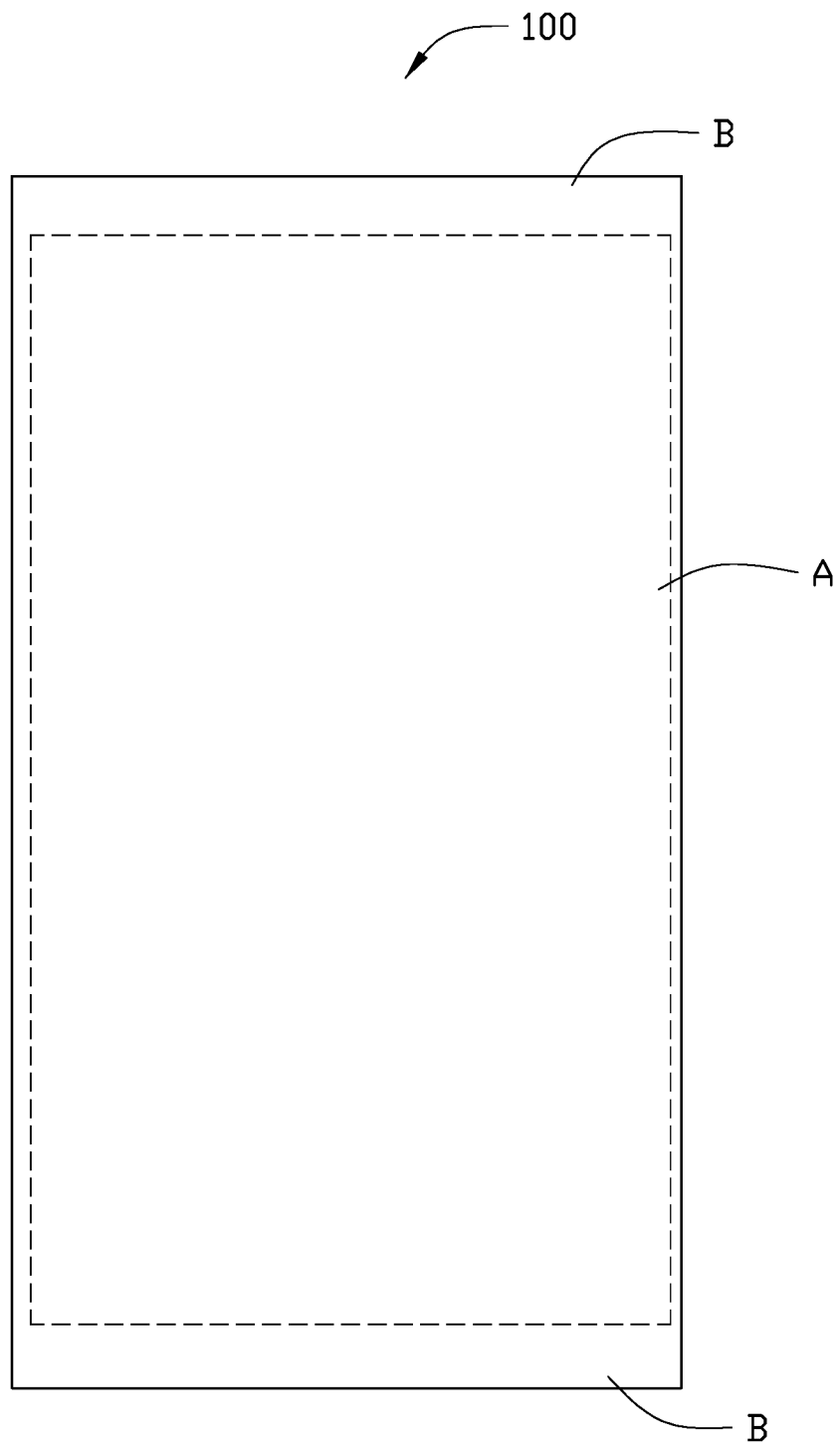
FIG. 1 is a plan view of an embodiment of a display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to a multi-function display apparatus.

FIG. 1 illustrates a display apparatus 100. The display apparatus 100 includes a display region A and a non-display region B surrounding the display region A. The display region A displays images. The non-display region B identifies fingerprints, and is not used to display images. The non-display region B is a frame region surrounding the display region A. In at least one embodiment, the display apparatus 100 is a liquid crystal display, or an organic light-emitting diode (OLED) display.

Figure 2:
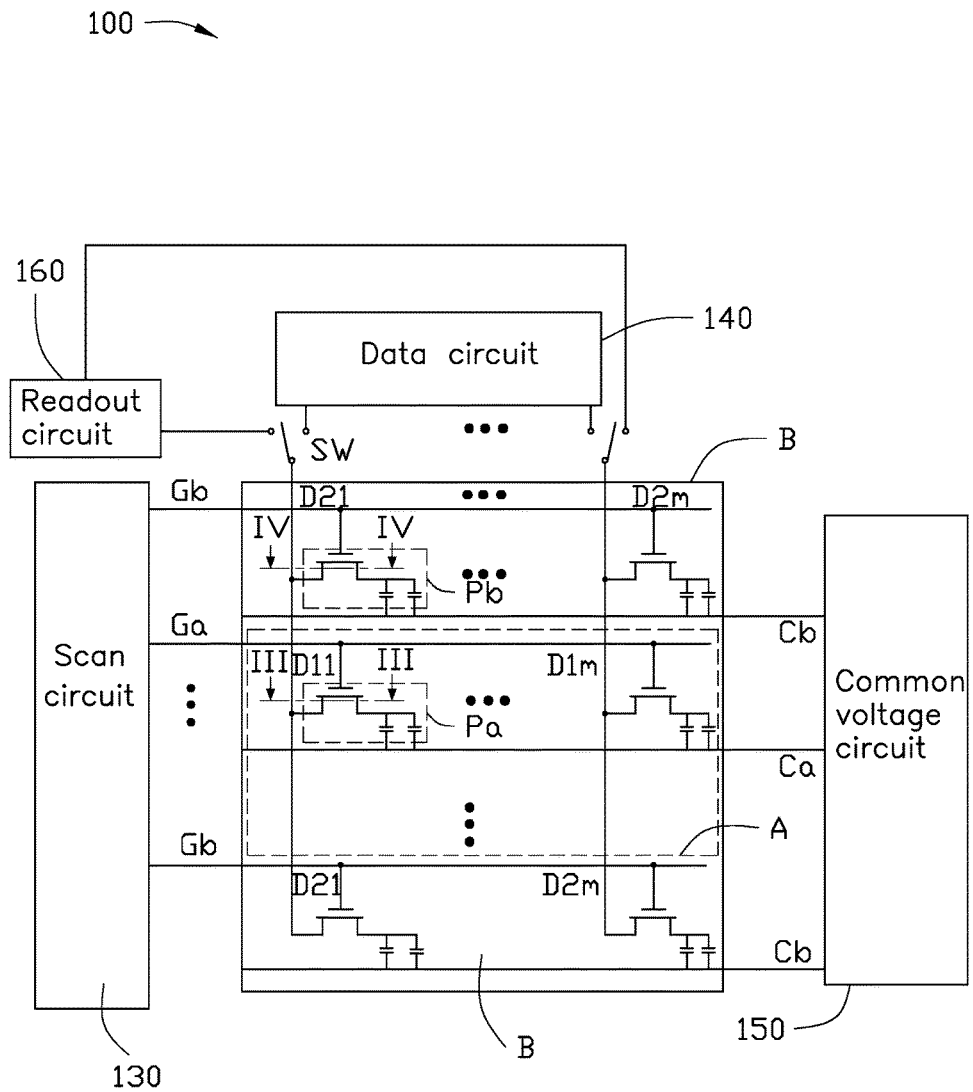
FIG. 2 is a block diagram view of an embodiment of the display apparatus of FIG. 1.

FIG. 2 illustrates a diagrammatic view of the display apparatus 100. The display apparatus 100 further includes a plurality of first scan lines Ga extending along a first direction X, a plurality of second scan lines Gb parallel to the first scan lines Ga, a plurality of data lines D11-D1$m$ extending along a second direction Y, and a plurality of data extending lines D21-D2$m$ parallel to the data lines D11-D1$m$. The display apparatus 100 also includes a plurality of first common lines Ca extending along the first direction X, a plurality of second common lines Cb parallel to the first common lines Ca, a scan circuit 130, a data circuit 140, a common voltage circuit 150, and a readout circuit 160. The Y direction is perpendicular to the first direction X. The data lines D11-D1$m$ are insulated from the first scan lines Ga and the first common lines Ca, and are crossed with the first scan lines Ga and the first common lines Ca to form a plurality of display pixel units Pa in a matrix. The data extending lines D21-D2$m$ are insulated from the second scan lines Gb and the second common lines Cb, and are crossed with the second scan lines Gb and the second common lines Cb to form a plurality of dummy pixel units Pb in a matrix. In at least one embodiment, the data extending lines D21-D2$m$ and the data lines D11-D1$m$ are formed in a single process.

The scan circuit 130 is electrically connected to the display pixel units Pa by the first scan lines Ga, and is electrically connected to the dummy pixel units Pb by the second scan lines Gb. The scan circuit 130 generates a first scan signal to the display pixel units Pa, and generates a second scan signal to the dummy pixel units Pb.

The data circuit 140 is electrically connected to the display pixel units Pa by data lines D11-D1$m$ and double-throw switches SW, and is electrically connected to the dummy pixel units Pb by the data extending lines D21-D2$m$ and one of the double-throw switches SW. Each of the data extending lines D21-D2$m$ and the data lines D11-D1$m$ are electrically connected to the data circuit 140 by the one double-throw switch SW. The data circuit 140 generates the image data signal to the display pixel units Pa and the dummy pixel units Pb.

The common voltage circuit 150 is electrically connected to the display pixel units Pa by the first common lines Ca, and is electrically connected to the dummy pixel units Pb by the second common lines Cb. The common voltage circuit 150 generates a common voltage Vcom to the first common lines Ca and the second common lines Cb. In at least one embodiment, the common voltage Vcom is 0 volts.

The readout circuit 160 is electrically connected to the data extending lines D21-D2m by the double-throw switches SW. The readout circuit 160 identifies a fingerprint.

Figure 3:
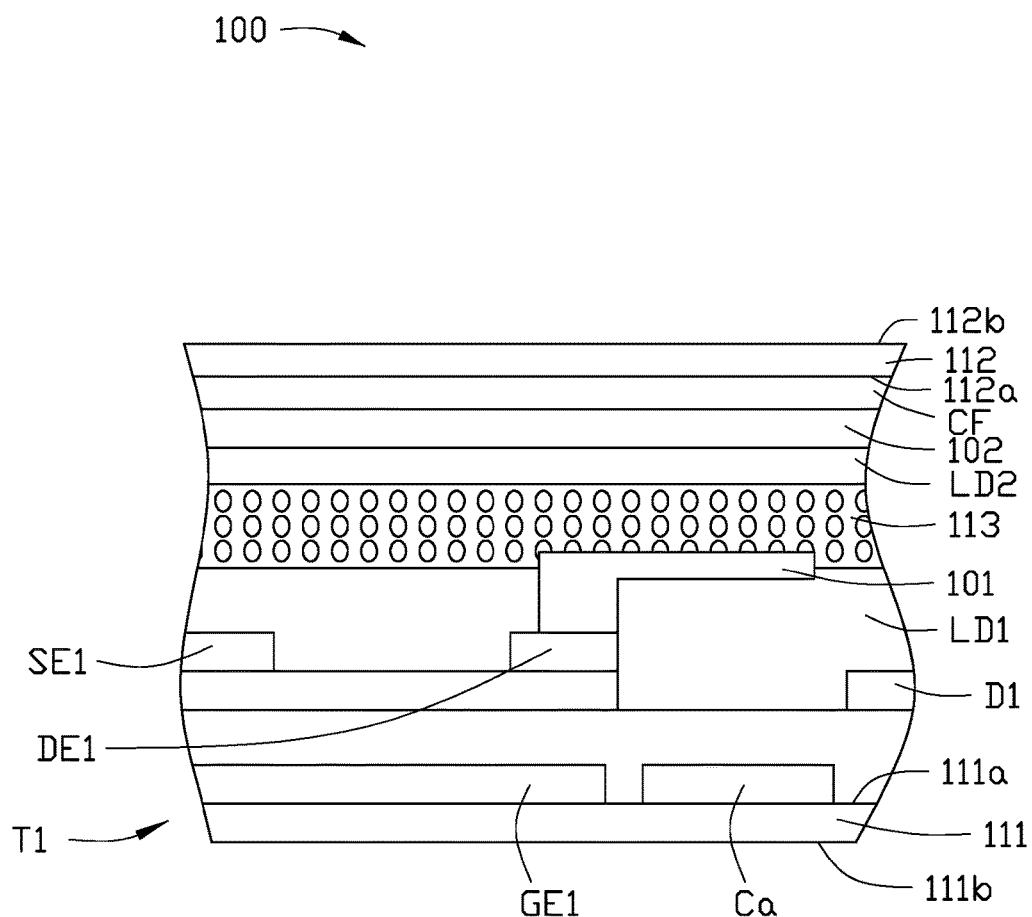
FIG. 3 is a cross-sectional view of a first embodiment of a display pixel unit of the display apparatus taken along lines of FIG. 2.

FIG. 3 illustrates one of the display pixel units Pa in a cross-sectional view. The display apparatus 100 further includes a first substrate 111, a second substrate 112, and a liquid crystal layer 113 sandwiched between the first substrate 111 and the second substrate 112. The liquid crystal layer 113 corresponds to the display region A and the non-display region B.

The first substrate 111 includes a first surface 111a facing the second substrate 112 and a second surface 111b opposite to the first surface 111a. In at least one embodiment, an array structure (not shown) is formed on the first surface 111a, such as a thin film transistor (TFT) structure.

Each of the display pixel units Pa includes at least one first switch T1 and at least one first electrode 101. The first switches T1 and the data lines D11-D1m (shown as D1) are located on the first surface 111a of the first substrate 111. The first switch T1 includes a first gate electrode GE1 located on the first surface 111a, a first source electrode SE1, and a first drain electrode DE1. The first source electrode SE1 and the first drain electrode DE1 are disposed on the first gate electrode GE1. The first electrode 101 is disposed over the first switches T1 and the data lines D11-D1m. A first insulation layer LD1 is disposed over the data lines D11-D1m, and is further sandwiched between the first electrode 101 and the corresponding first switch T1. In at least one embodiment, the first switch T1 is a thin film transistor, and the drain electrode DE1 is directly electrically connected to the first electrode 101. In other embodiments, the drain electrode DE1 is electrically connected to the first electrode 101 by a conductive hole passing through the first insulation layer LD1.

Figure 5:
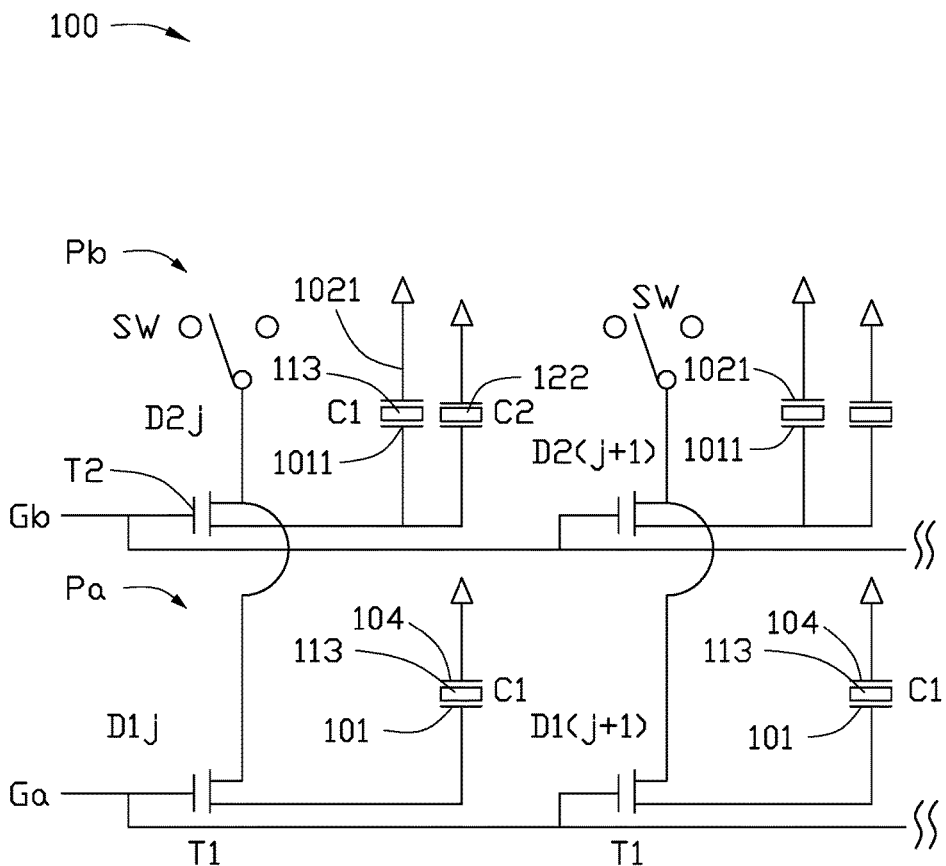
FIG. 5 is a diagrammatic view of an equivalent circuit of the display apparatus of FIG. 1.

The second substrate 112 includes a third surface 112a facing the first substrate 111 and a fourth surface 112b opposite to the third surface 112a. A color filter layer CF, a second electrode layer 102, and a second insulation layer LD2 are stacked on the third surface 112a in that sequence. In at least one embodiment, each of the first electrodes 101 is a pixel electrode and the second electrode layer 102 is a common electrode layer. The second electrode layer 102 includes a plurality of second electrodes 104 (as shown in FIG. 5).

Figure 4:
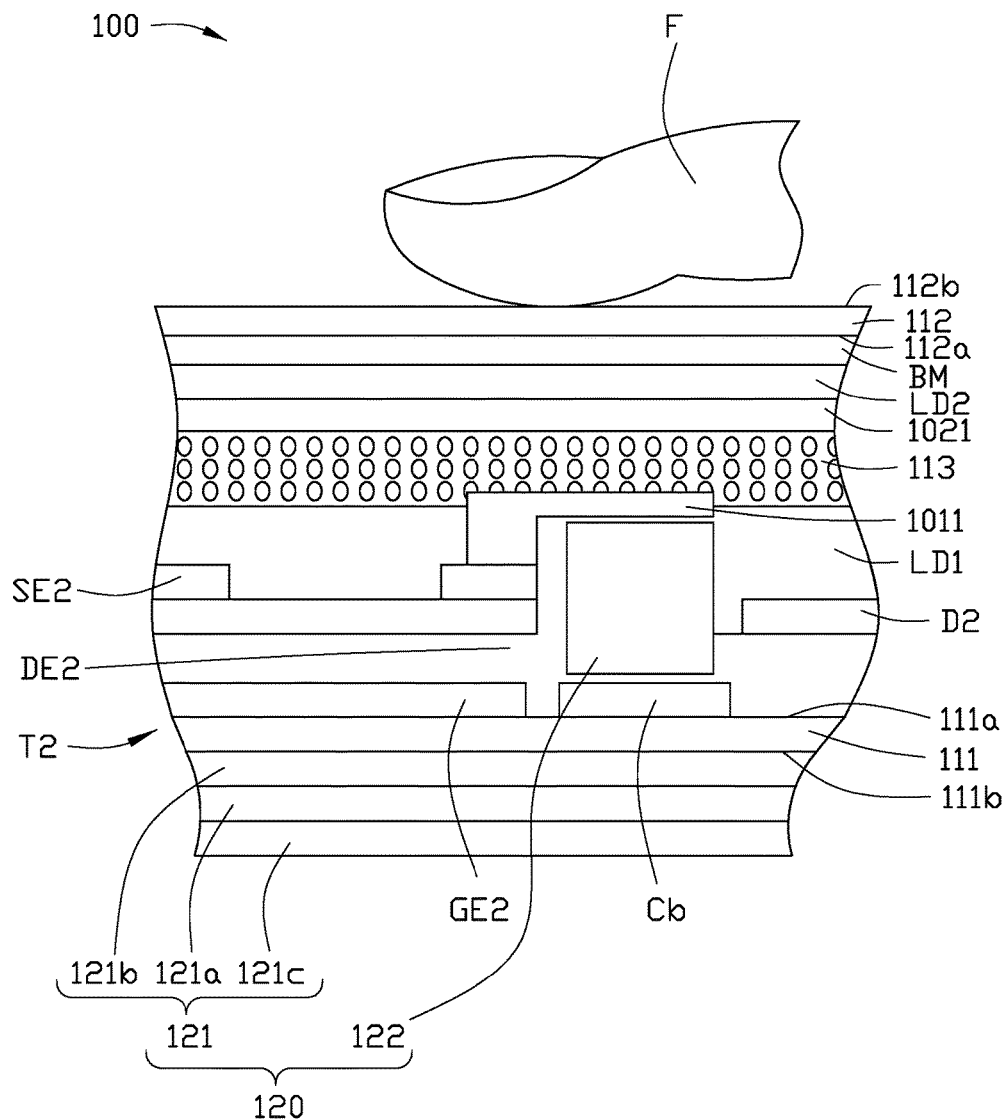
FIG. 4 is cross-sectional view of a first embodiment of a dummy pixel unit of the display apparatus taken along lines Iv-Iv of FIG. 2.

FIG. 4 illustrates one of the dummy pixel units Pb in a cross-sectional view. The dummy pixel units Pb sense when a fingertip is pressed against the screen and transmit fingerprint signals. The dummy pixel units Pb are not used to display images.

Each of the dummy pixel units Pb includes at least one second switch T2, a first auxiliary electrode 1011, and a second auxiliary electrode 1021. The structure of the second switch T2 is the same as the structure of the first switch T1. The second switch T2 includes a second gate electrode GE2 located on the first surface 111a, a semiconductor layer (not labeled), a second source electrode SE2, and a second drain electrode DE2.

A shield layer BM and a second insulation layer LD2 are laid on the third surface 112a in that sequence. The second auxiliary electrode 1021 is disposed below the second insulation layer LD2. The shield layer BM shields against light. In at least one embodiment, the shield layer BM is made of black resin, Cr, or chromium oxide material.

A fingerprint identification module 120 is provided in the non-display region B. The fingerprint identification module 120 includes a signal transmitting layer 121, and a plurality of signal receiving components 122. The signal transmitting layer 121 is disposed on the second surface 111b of the first substrate 111, and the signal receiving components 122 are positioned at a side of the first substrate 111 adjacent to the first surface 111a. The signal transmitting layer 121 generates ultrasonic wave. The signal transmitting layer 121 includes a signal transmitting portion 121a, a first conductive portion 121b, and a second conductive portion 121c. The first conductive portion 121b cooperates with the second conductive portion 121c to generate the ultrasonic wave based on a voltage difference existing between the first conductive portion 121b and the second conductive portion 121c. In at least one embodiment, the signal transmitting portion 121a is sandwiched between the first conductive portion 121b and the second conductive portion 121c, the first conductive portion 121b is disposed on the second surface 111b, and the second conductive portion 121c is disposed on the signal transmitting portion 121a.

The signal receiving component 122 receives the reflected ultrasonic wave, transfers the received reflected ultrasonic wave into fingerprint identification signal Dt, and transmits them to the first auxiliary electrode 1011. The second common lines Cb, the signal receiving component 122, and the first auxiliary electrode 1011 are laid on the first surface 111a in that sequence. In at least one embodiment, the signal receiving component 122 is made of one of polyvinylidene fluoride (PVDF), polyvinylidene fluoride-trifluoroethylene (PVDF-TrFE), a piezoelectric transducer (PZT), or an electrostatic transducer.

FIG. 5 illustrates an equivalent circuit of the display apparatus 100. The first scan line Ga, the second scan line Gb, two adjacent data lines D1j-D1(j+1), and two adjacent data extending lines D2j-D2(j+1) are shown. The first switch T1 is electrically connected to the first scan line Ga, and at least one of the data lines D11-D1m corresponds to the first switch T1 and the first electrode 101. The first switch T1 switches between a turned-on state and a turned-off state based on the first scan signal of the first scan line Ga. When in the turned-on state, the first switch T1 transmits the image data signal on one of the data lines D11-D1m corresponding to the first switch T1 to the first electrode 101. The first electrode 101, the second electrode 104, and the liquid crystal layer 113 cooperate with each other to form a first capacitor C1. The second electrode 104 is electrically connected to the common line Ca for receiving the common voltage Vcom. Each of the data extending lines D2j-D2(j+1) transmits the image data signal and the fingerprint signal in turn. In at least one embodiment, each of the data extending lines D2j-D2(j+1) transmits the fingerprint signal after the data lines D1j-D1(j+1) corresponding to the data extending lines D2j-D2(j+1) have completed the transmission of the image data signal. The first scan line Ga, the first common line Ca, and one of the data lines D1j-D1(j+1) corresponding to the first scan line Ga cooperate with each other to form an array structure located on the first surface 111a for driving the display pixel unit Pa to display images.

The second switch T2 is electrically connected to the second scan line Gb, the data extending line D2, and the first auxiliary electrode 1011. The second switch T2 switches between the turned-on state and the turned-off state based on the second scan signal of the second scan line Gb. The data extending lines D2j-D2(j+1) are electrically connected to the data lines D1j-D1(j+1). When in the turned-on state, the second switch T2 transmits fingerprint signals from the first auxiliary electrode 1011 to the data extending line D2. The second auxiliary electrode 1021 is electrically connected to the second common line Cb for receiving the common voltage. The second auxiliary electrode 1021, the liquid crystals in the liquid crystal layer 113, and the first auxiliary electrode 1011 cooperate with each other to form a second capacitor C2.

During a display period, the first electrode 101 drives liquid crystals in the liquid crystal layer 113 to rotate based on a gray voltage of the image data signal of one of the data lines D11-D1m corresponding to the first electrode 101 and the common voltage Vcom provided to the second electrode 104. During a fingerprint identification period, the signal receiving component 122 transmits the fingerprint identification signal Dt to the first auxiliary electrode 1011 by the second capacitor C2.

Figure 6:
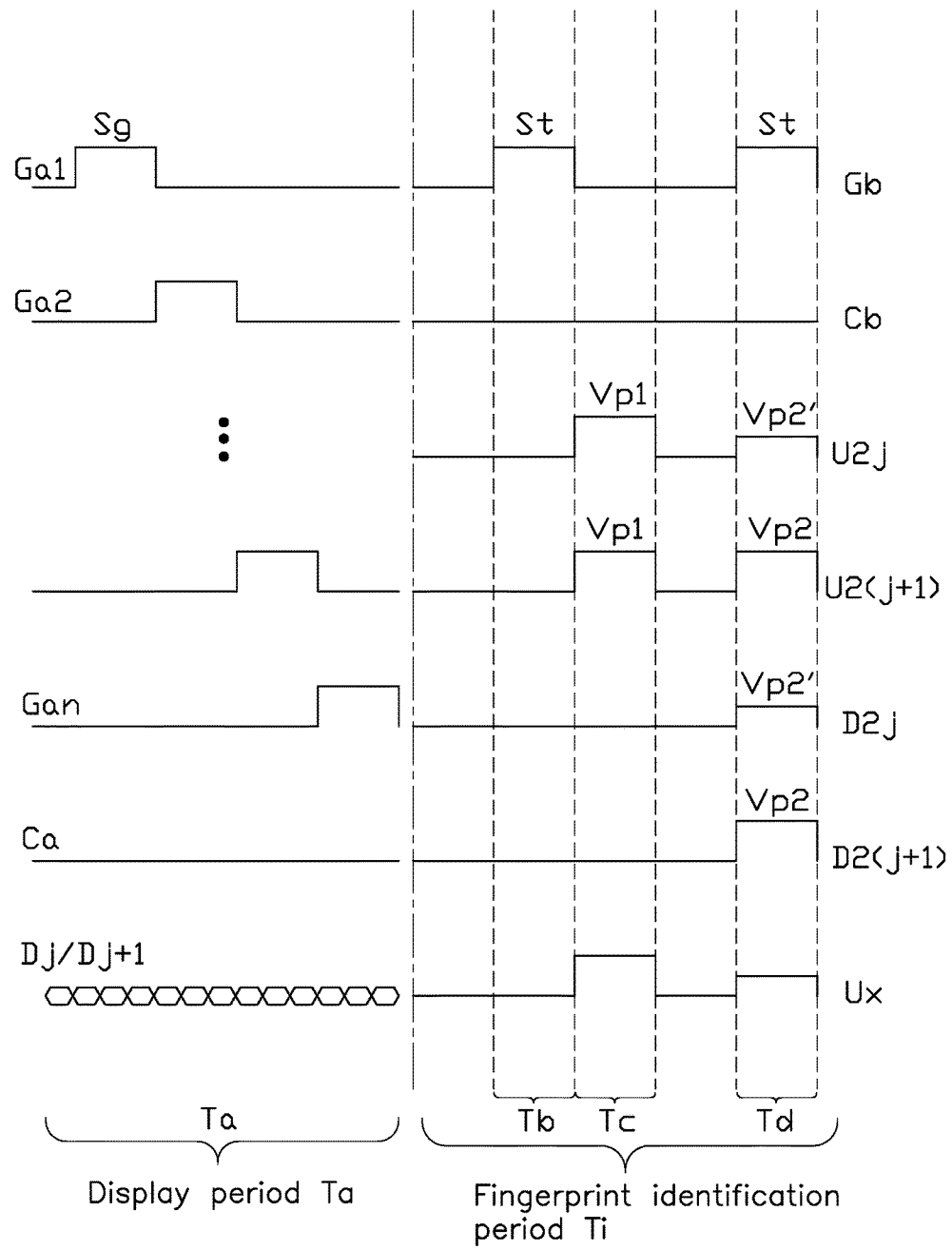
FIG. 6 is a diagram of driving waveforms of the display apparatus of FIG. 2.

FIG. 6 shows driving waveforms of the display apparatus 100. In turn, the display apparatus 100 works in a display period (period Ta) and in a fingerprint identification period (period Ti). Period Ti and display period Ta can never be simultaneous. The scan circuit 130 sequentially provides a first scan signal Sg to the first scan lines Ga in the display period Ta, and sequentially provides a second scan signal St to the second scan lines Gb in the fingerprint identification period Ti. The fingerprint identification period Ti includes a reset period Tb, a transmitting period Tc, and a readout period Td.

Ga1 through Gan denote driving waveforms of the first scan lines Ga while in the display period Ta. "Gb" denotes a driving waveform of the second scan line Gb. Ca through Cb denote driving waveforms of the first common line Ca and the second common line Cb. "U2j" denotes a driving waveform of the first auxiliary electrode 1011 connected to the data extending line D2j. "U2(j+1)" denotes a driving waveform of the first auxiliary electrode 1011 connected to the data extending line D2(j+1). "D2j" denotes a driving waveform of the data line D2j. "D2(j+1)" denotes a driving waveform of the data line D2(j+1). "Ux" denotes a waveform of the signal transmitting layer 121.

Figure 7:
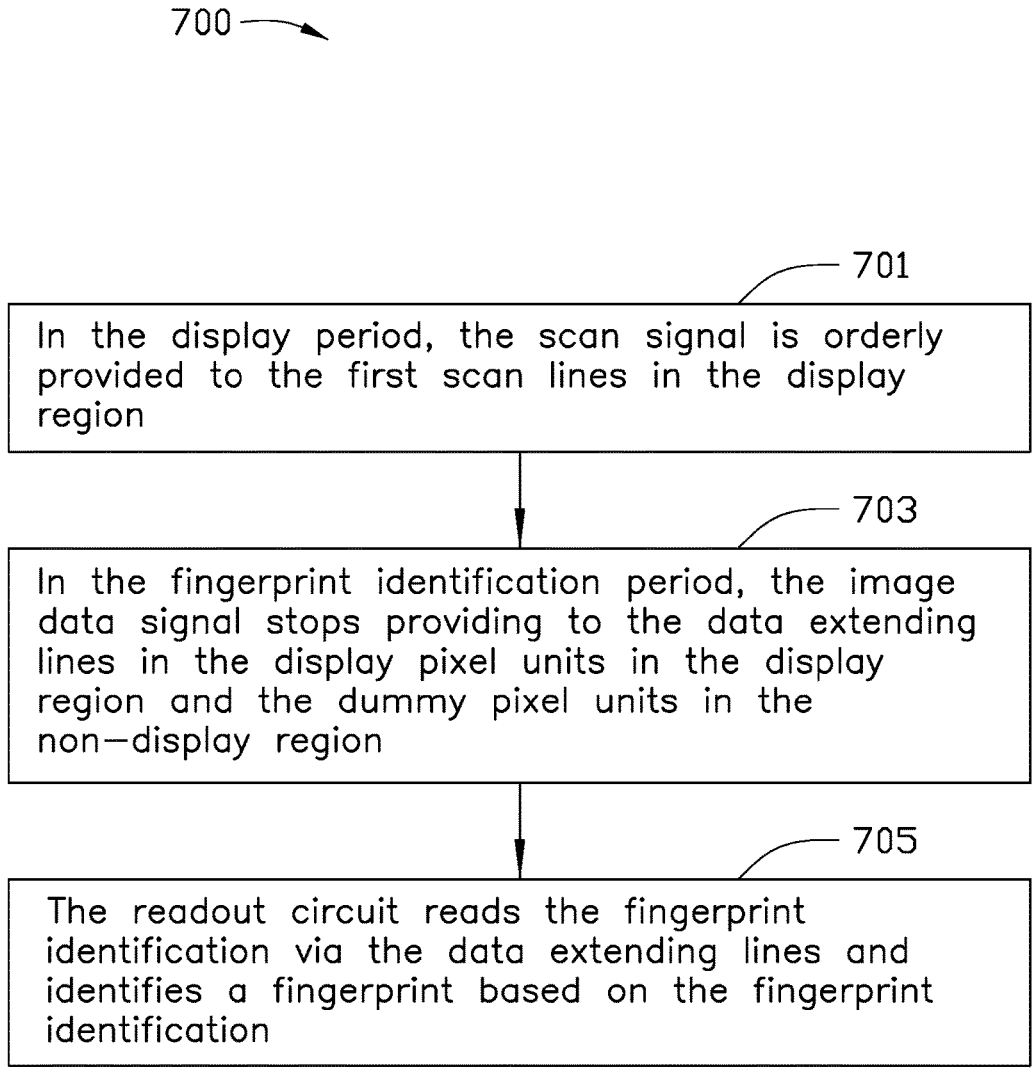
FIG. 7 is a flowchart of a driving method of the display apparatus of FIG. 2.

FIG. 7 illustrates a method 700 for driving the display apparatus 100. The method 700 is provided by way of example, as there are a variety of ways to carry out the method. The method 700 described below can be carried out using the configurations illustrated in FIGS. 1-6, for example, and various elements of these figures are referenced in explaining the method 700. Each block shown in FIG. 7 represents one or more processes, methods, or subroutines, carried out in the method 700. Furthermore, the order of blocks is illustrative only and the order of the blocks can change. Additional blocks can be added or blocks can be removed without departing from this disclosure. The method 700 can begin at block 701.

At block 701, in the display period Ta, the scan signal Sg is orderly provided to the first scan lines Ga1-Gan in the display region A. The first switch T1 switches to the turned-on state when receiving the scan signal Sg and the image data signal outputted by the data circuit 140 is transmitted to the first electrode 101 by the data lines D1j-D1(j+1). The common voltage is provided to the second electrode 104 by the first common line Ca. The first electrode 101 and the second electrode 104 cooperate with each other to drive the liquid crystal layer 113 to display images. When the scan signal Sg is provided to one of the first scan lines Gai, the first switches T1 connected to the first scan line Gai switch to the turned-on state, and all of the data lines D1j-D1(j+1) receive the image data signals. The voltage of the first electrode 101 is equal to the gray voltage of the image data signal and the voltage of the second electrode 104 is equal to the common voltage Vcom.

At block 703, in the fingerprint identification period Ti, the image data signal is not provided to the data extending lines D2j-D2(j+1) in the display pixel units Pa in the display region A and the dummy pixel units Pb in the non-display region B. The display pixel units Pa thus stop displaying images. The signal transmitting layer 121 generates the ultrasonic wave, and the signal receiving component 122 transfers the echo from the fingerprint on the non-display region B into the fingerprint identification signal Dt, and transmits the fingerprint identification signal Dt to the first auxiliary electrode 1011. The readout circuit 160 reads the fingerprint identification signal Dt to identify the fingerprint.

In detail, the fingerprint identification period Ti includes a reset period Tb (reset), a transmitting period Tc, and a readout period Td. In the reset period Tb (reset), a second scan signal St is provided to the second scan lines Gb and the second switches T2 switches into the turned-on state. The second auxiliary electrode 1021 receives a reset signal which causes the first auxiliary electrode 1011 to be reset by the second capacitor C2 being discharged. In at least one embodiment, the reset signal is 0 volts. In the transmitting period Tc, the second scan signal St is not provided to the second scan lines Gb and the signal transmitting layer 121 generates the ultrasonic waves towards the second substrate 112. The signal receiving component 122 transfers the reflected ultrasonic waves into a first receiving voltage Vp1, and transmits the first receiving voltage Vp1 to the first auxiliary electrode 1011 by the second capacitor C2 being charged. In the readout period Td, the signal receiving component 122 transfers the received ultrasonic waves reflected by second substrate 112 into a second receiving voltage Vp2, and transmits the second receiving voltage Vp2 as the fingerprint identification Dt to the second auxiliary electrode 1021. The second receiving voltage Vp2 also transmits to the first auxiliary electrode 1011 by the second capacitor C2. When a fingertip is pressed on the non-display region B, energy of the reflected ultrasonic wave is changed, which causes the second receiving voltage Vp2 to be decreased. The second scan signal St is provided to the second scan lines Gb again, and the second switch T2 switches to the turned-on state, which causes the fingerprint identification Dt to be transmitted to the data extending lines D2j-D2(j+1).

At block 705, the readout circuit 160 reads the fingerprint identification Dt by the data extending lines D2j-D2(j+1), and identifies a fingerprint based on the fingerprint identification Dt. In detail, the readout circuit 160 processes fingerprint identification Dt to obtain an image of the finger.

Figure 8:
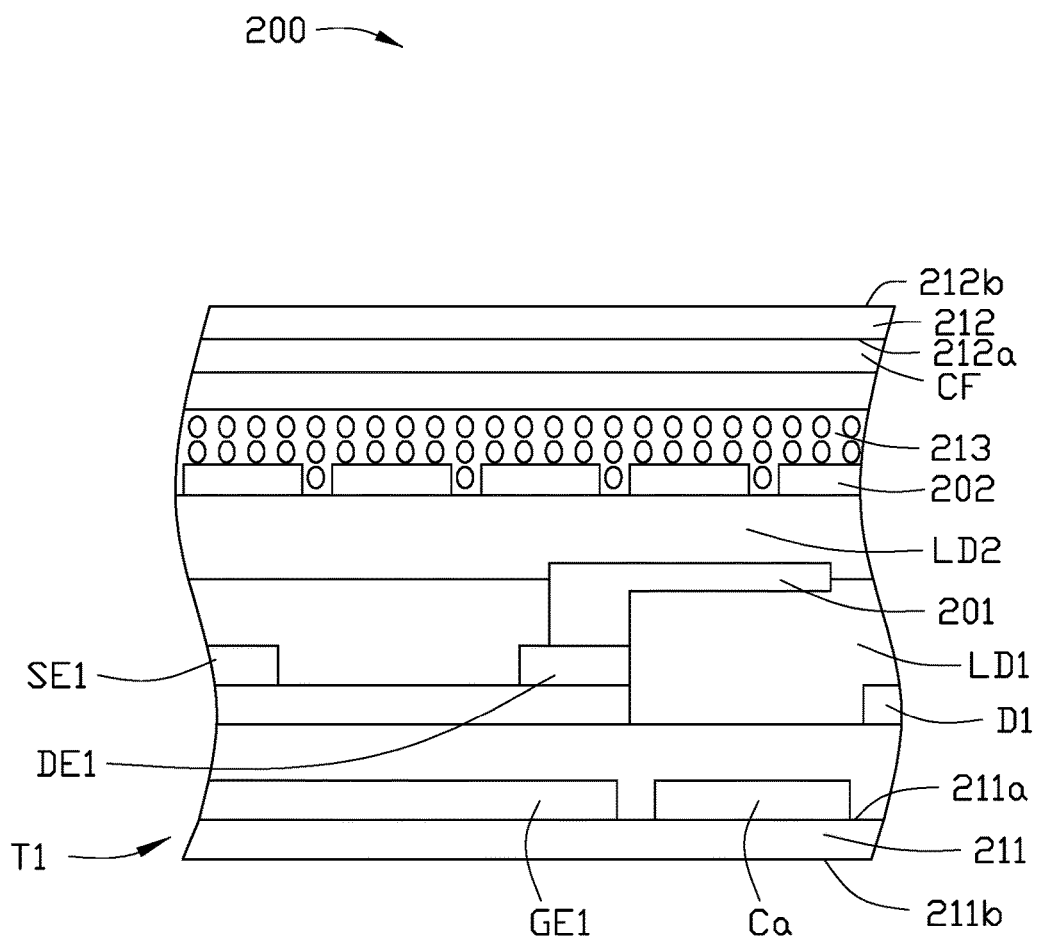
FIG. 8 is a cross-sectional view of a second embodiment of the display pixel unit of FIG. 3.

FIG. 8 illustrates a second embodiment of the display pixel unit Pa in the display region A of the display apparatus 200. The display apparatus 200 further includes a first substrate 211, a second substrate 212, and a liquid crystal layer 213 sandwiched between the first substrate 211 and the second substrate 212. The liquid crystal layer 213 corresponds to the display region A and the non-display region B.

In at least one embodiment, the display apparatus 200 is an in-plane switching (IPS) display.

The first substrate 211 includes a first surface 211a facing the second substrate 212 and a second surface 211b opposite to the first surface 211a. In at least one embodiment, an array structure such as a TFT structure (not shown) is formed on the first surface 211a.

Each of the display pixel units Pa includes at least one first switch T1 and at least one first electrode 201. The first switch T1 and the data lines D11-D1m are located on the first surface 211a of the first substrate 211. The first switch T1 includes a first gate electrode GE1 located on the first surface 111a, a first source electrode SE1, and a first drain electrode DE1. The first source electrode SE1 and the first drain electrode DE1 are disposed on the first gate electrode GE1. The first electrode 201 is disposed over the first switches T1 and the data lines D11-D1m by a first insulation layer LD1. In at least one embodiment, the first switch T1 is a TFT, and the drain electrode DE1 is directly electrically connected to the first electrode 201. In other embodiments, the drain electrode DE1 is electrically connected to the first electrode 201 by a conductive hole passing through the first insulation layer LD1.

A second insulation layer LD2 covers the first electrode 201. A second electrode layer 202 is formed on a side of the second insulation layer LD2 opposite to the first electrode 201.

The second substrate 212 includes a third surface 212a facing the first substrate 211 and a fourth surface 212b opposite to the third surface 212a. A color filter layer CF is formed on the third surface 212a. In at least one embodiment, each of the first electrodes 201 is a pixel electrode, and the second electrode layer 202 is a common electrode layer. The second electrode layer 202 includes a plurality of second electrodes (not shown).

Figure 9:
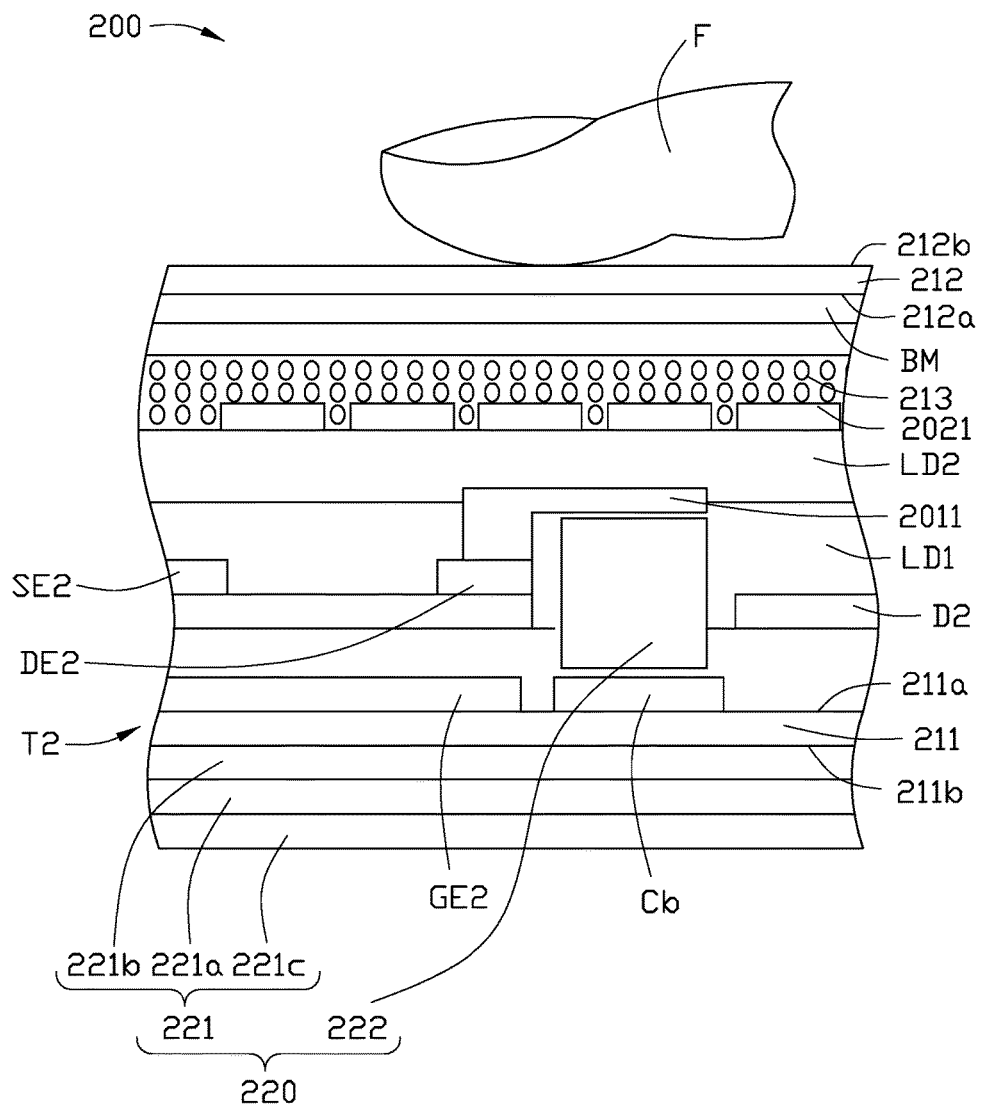
FIG. 9 is a cross-sectional view of the second embodiment of the dummy pixel unit of FIG. 4.

FIG. 9 illustrates a second embodiment of the dummy pixel unit Pb in the non-display region B of the display apparatus 200. The dummy pixel unit Pb transmits the signals when a fingertip is pressed against the screen, and is not used to display images.

Each of the dummy pixel units Pb includes at least one second switch T2, a first auxiliary electrode 2011, and a second auxiliary electrode 2021. The structure of the second switch T2 is the same as the structure of the first switch T1. The second switch T2 includes a second gate electrode GE2 located on the first surface 211a, a semiconductor layer (not labeled), a second source electrode SE2, and a second drain electrode DE2. The second gate electrode GE2 is electrically connected to the second scan line Gb. The second drain electrode DE2 is electrically connected to the first auxiliary electrode 2011.

The second insulation layer LD2 covers the first auxiliary electrode 2011. A plurality of second auxiliary electrodes 2021 is formed on a side of the second insulation layer LD2 opposite to the first auxiliary electrode 2011. A shield layer BM is formed on the third surface 212a. The shield layer BM shields against light. In at least one embodiment, the shield layer BM is made of black resin, Cr, or chromium oxide material.

A fingerprint identification module 220 is provided in the non-display region B. The fingerprint identification module 220 includes a signal transmitting layer 221, and a plurality of signal receiving components 222. The signal transmitting layer 221 is disposed on the second surface 211b of the first substrate 211, and the signal receiving components 222 are positioned at a side of the first substrate 211 adjacent to the first surface 211a. The signal transmitting layer 221 generates ultrasonic wave. The signal transmitting layer 221 includes a signal transmitting portion 221a, a first conductive portion 221b, and a second conductive portion 221c. The first conductive portion 221b cooperates with the second conductive portion 221c to generate the ultrasonic wave based on a voltage difference existing between the first conductive portion 221b and the second conductive portion 221c. In at least one embodiment, the signal transmitting portion 221a is sandwiched between the first conductive portion 221b and the second conductive portion 221c. The first conductive portion 221b is disposed on the second surface 211b and the second conductive portion 221c is disposed on the signal transmitting portion 221a.

The signal receiving component 222 receives the reflected ultrasonic waves, converts the received waves into fingerprint identification signal Dt, and transmits the signal to the first auxiliary electrode 2011. The second common lines Cb, the signal receiving component 222, and the first auxiliary electrode 2011 are laid on the first surface 211a in that sequence. In at least one embodiment, the signal receiving component 222 is made of one of polyvinylidene fluoride (PVDF), polyvinylidene fluoride-trifluoroethylene (PVDF-TrFE), a piezoelectric transducer (PZT), or an electrostatic transducer.

Figure 10:
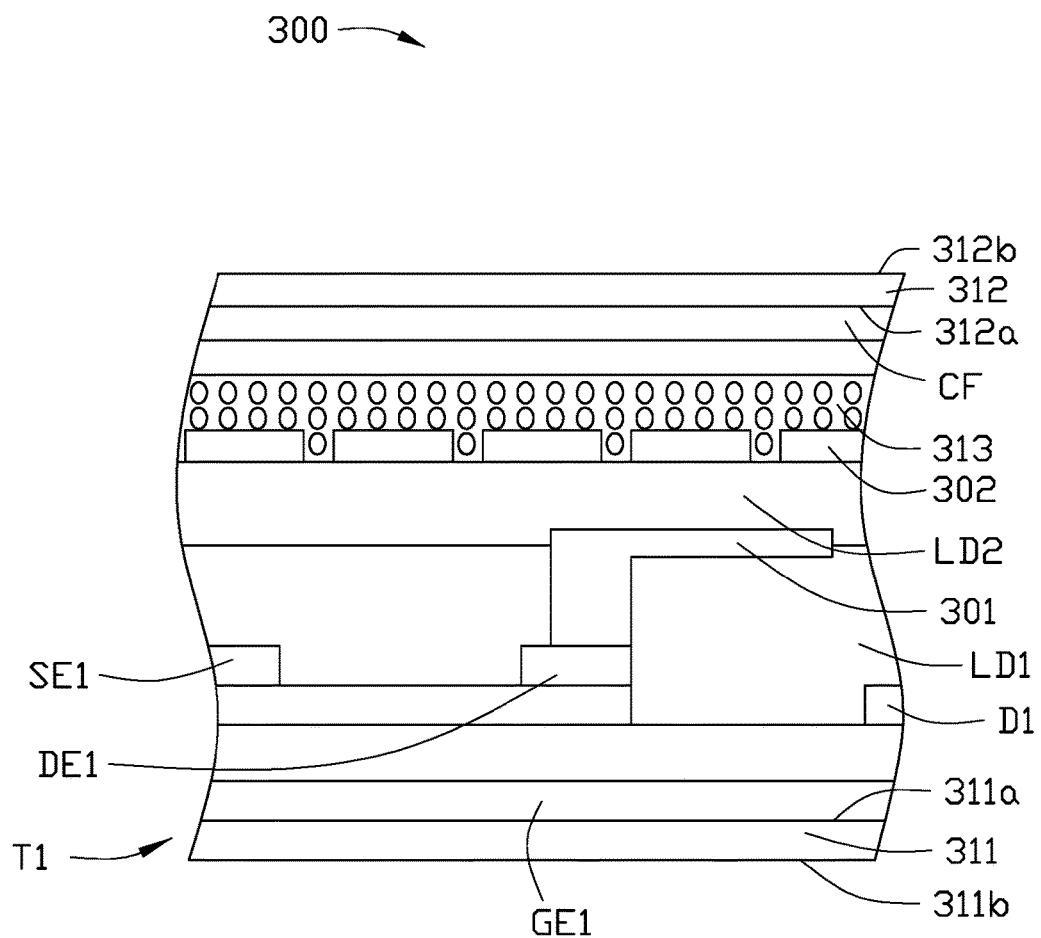
FIG. 10 is a cross-sectional view of a third embodiment of the display pixel unit of FIG. 3.

FIG. 10 illustrates a third embodiment of the display pixel unit Pa in the display region A of the display apparatus 300. The display apparatus 300 further includes a first substrate 311, a second substrate 312, and a liquid crystal layer 313 sandwiched between the first substrate 311 and the second substrate 312. The liquid crystal layer 313 corresponds to the display region A and the non-display region B.

The first substrate 311 includes a first surface 311a facing the second substrate 312 and a second surface 311b opposite to the first surface 311a. In at least one embodiment, an array structure such as a TFT structure (not shown) is formed on the first surface 311a.

Each of the display pixel units Pa includes at least one first switch T1 and at least one first electrode 301. The first switch T1 is located on the first surface 311a of the first substrate 311. The first switch T1 includes a first gate electrode GE1 located on the first surface 311a, a first source electrode SE1, and a first drain electrode DE1. The first source electrode SE1 and the first drain electrode DE1 are disposed on the first gate electrode GE1. The first source electrode SE1 is electrically connected to one of the data lines D11-D1m corresponding to the first switch T1, and the first drain electrode DE1 is electrically connected to the first electrode 301. The first electrode 301 is disposed over the first switches T1 and the data lines D11-D1m by a first insulation layer LD1. In at least one embodiment, the first switch T1 is a TFT, and the drain electrode DE1 is directly electrically connected to the first electrode 301. In other embodiments, the drain electrode DE1 is electrically connected to the first electrode 301 by a conductive hole passing through the first insulation layer LD1.

A second insulation layer LD2 covers the first electrode 301. A second electrode layer 302 is formed on a side of the second insulation layer LD2 opposite to the first electrode 301. The second electrode layer 302 includes a plurality of second electrodes (not shown).

The second substrate 312 includes a third surface 312a facing the first substrate 311 and a fourth surface 312b opposite to the third surface 312a. A color filter layer CF is formed on the third surface 312a. In at least one embodiment, each of the first electrodes 301 is a pixel electrode and the second electrode layer 302 is a common electrode layer.

Figure 11:
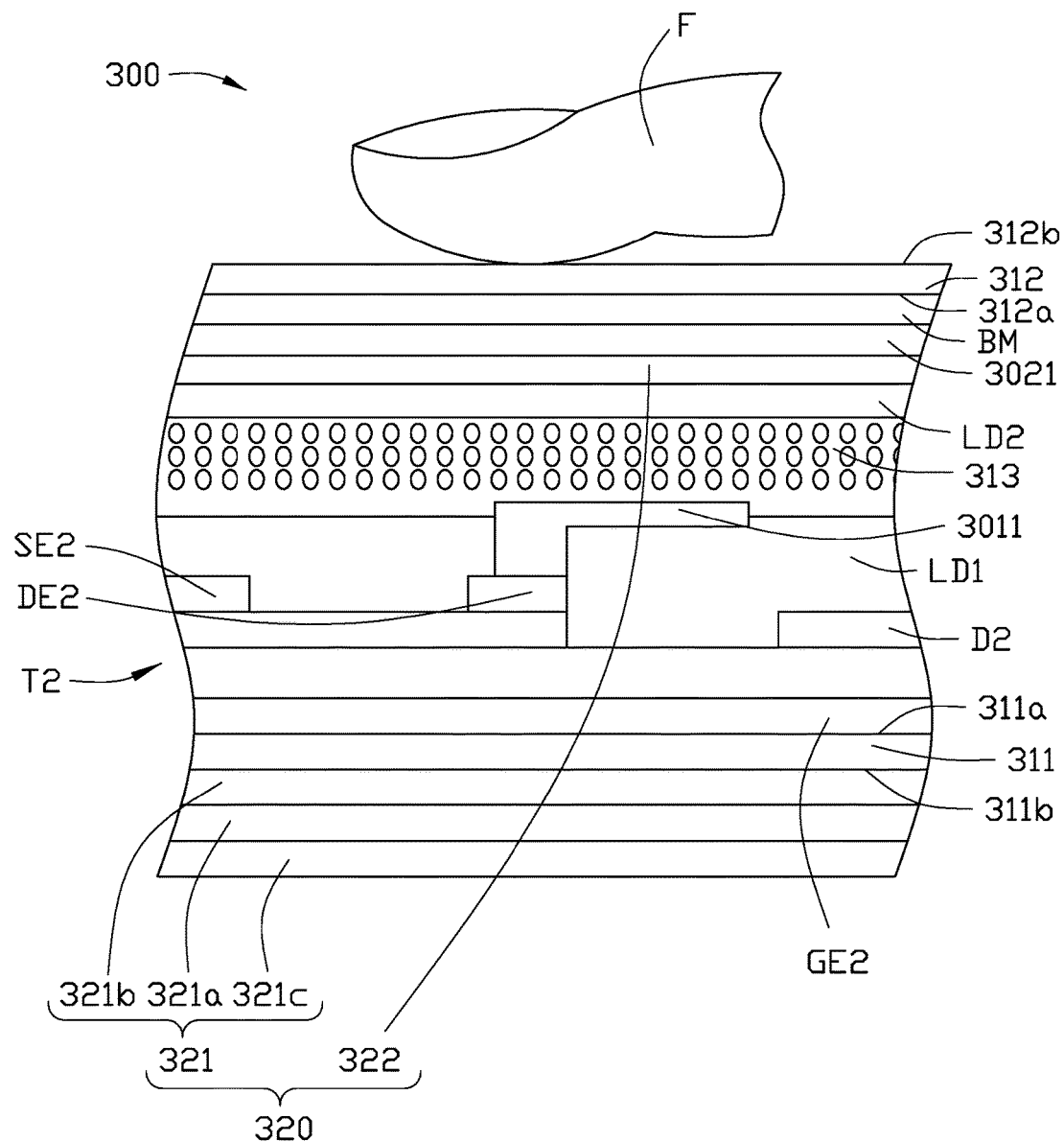
FIG. 11 is a cross-sectional view of the third embodiment of the dummy pixel unit of FIG. 4.

FIG. 11 illustrates a third embodiment of one of the dummy pixel unit Pb in the display region B of the display apparatus 300. The dummy pixel units Pb transmit fingerprint signals when a fingertip is pressed against the screen. The dummy pixel units Pb are not used to display images.

Each of the dummy pixel units Pb includes at least one second switch T2, a first auxiliary electrode 3011, and a second auxiliary electrode 3021. The structure of the second switch T2 is the same as the structure of the first switch T1. The second switch T2 includes a second gate electrode GE2 located on the first surface 311a, a semiconductor layer (not labeled), a second source electrode SE2, and a second drain electrode DE2. The second source electrode SE2 is electrically connected to the data extending line D2. The second drain electrode DE2 is electrically connected to the first auxiliary electrode 3011. The first auxiliary electrode 3011 is disposed on the second switch T2 and the first insulation layer LD1.

The second insulation layer LD2 covers and protects the first auxiliary electrode 3011. The second auxiliary electrodes 3021 are formed on a side of the second insulation layer LD2 opposite to the first auxiliary electrode 3011.

A shield layer BM and a second insulation layer LD2 are laid on the third surface 312a in that sequence. The second auxiliary electrodes 3021 are disposed below the second insulation layer LD2. The shield layer BM shields against light. In at least one embodiment, the shield layer BM is made of black resin, Cr, or chromium oxide material.

A fingerprint identification module 320 is provided in the non-display region B. The fingerprint identification module 320 includes a signal transmitting layer 321 and a plurality of signal receiving components 322. The signal transmitting layer 321 is disposed on the second surface 311b of the first substrate 311, and the signal receiving components 322 are positioned at a side of the first substrate 311 adjacent to the first surface 311a. The signal transmitting layer 321 generates ultrasonic wave. The signal transmitting layer 321 includes a signal transmitting portion 321a, a first conductive portion 321b, and a second conductive portion 321c. The first conductive portion 321b cooperates with the second conductive portion 321c to generate the ultrasonic waves based on a voltage difference existing between the first conductive portion 321b and the second conductive portion 321c. In at least one embodiment, the signal transmitting portion 321a is sandwiched between the first conductive portion 321b and the second conductive portion 321c. The first conductive portion 321b is disposed on the second surface 311b and the second conductive portion 321c is disposed on the signal transmitting portion 321a.

The signal receiving component 322 receives the reflected ultrasonic waves, converts the received waves into fingerprint identification signal Dt, and transmits the signal to the first auxiliary electrode 3011. The signal receiving component 322 is formed on a surface of the second auxiliary electrode 3021 opposite to the second insulation layer LD2. In at least one embodiment, the signal receiving component 322 is made of one of polyvinylidene fluoride (PVDF), polyvinylidene fluoride-trifluoroethylene (PVDF-TrFE), a piezoelectric transducer (PZT), or an electrostatic transducer.

Since the structure of the signal receiving component 322 is located upon the second auxiliary electrode 3021, the likelihood of damage to the signal receiving component 322 is reduced during high-temperature manufacture of the first substrate 311 and the second substrate 312, and a display performance of the signal receiving component 322 is improved.

Figure 12:
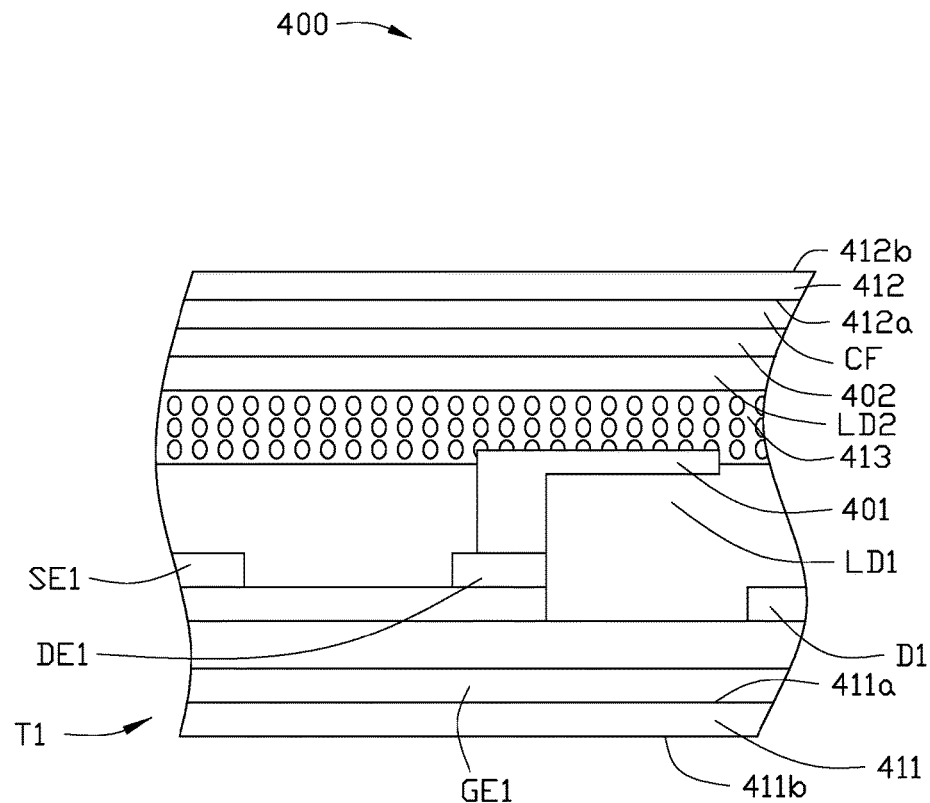
FIG. 12 is a cross-sectional view of a fourth embodiment of the display pixel unit of FIG. 3.

FIG. 12 illustrates a fourth embodiment of the display pixel unit Pa in the display region A of the display apparatus 400. The display apparatus 400 further includes a first substrate 411, a second substrate 412, and a liquid crystal layer 413 sandwiched between the first substrate 411 and the second substrate 412. The liquid crystal layer 413 corresponds to the display region A and the non-display region B.

The first substrate 411 includes a first surface 411a facing the second substrate 412 and a second surface 411b opposite to the first surface 411a. In at least one embodiment, an array structure such as a TFT structure (not shown) is formed on the first surface 411a.

Each of the display pixel units Pa includes at least one first switch T1 and at least one first electrode 401. The first switches T1 are located on the first surface 411a of the first substrate 411. The first switch T1 includes a first gate electrode GE1 located on the first surface 411a, a first source electrode SE1, and a first drain electrode DE1. The first source electrode SE1 and the first drain electrode DE1 are disposed on the first gate electrode GE1. The first source electrode SE1 is electrically connected to one of the data lines D11-D1m corresponding to the first switch T1 and the first drain electrode DE1 is electrically connected to the first electrode 401. The first electrode 401 is disposed over the first switches T1 and the data lines D11-D1m by a first insulation layer LD1. In at least one embodiment, the first switch T1 is a TFT, and the drain electrode DE1 is directly electrically connected to the first electrode 401. In other embodiments, the drain electrode DE1 is electrically connected to the first electrode 401 by a conductive hole passing through the first insulation layer LD1.

The second substrate 412 includes a third surface 412a facing the first substrate 411 and a fourth surface 412b opposite to the third surface 412a. A color filter layer CF, a second electrode layer 402, and a second insulation layer LD2 are laid on the third surface 412a in that sequence. In at least one embodiment, each of the first electrodes 401 is a pixel electrode and the second electrodes layer 402 is a common electrode layer. The second electrode layer 402 includes a plurality of second electrodes (not shown).

Figure 13:
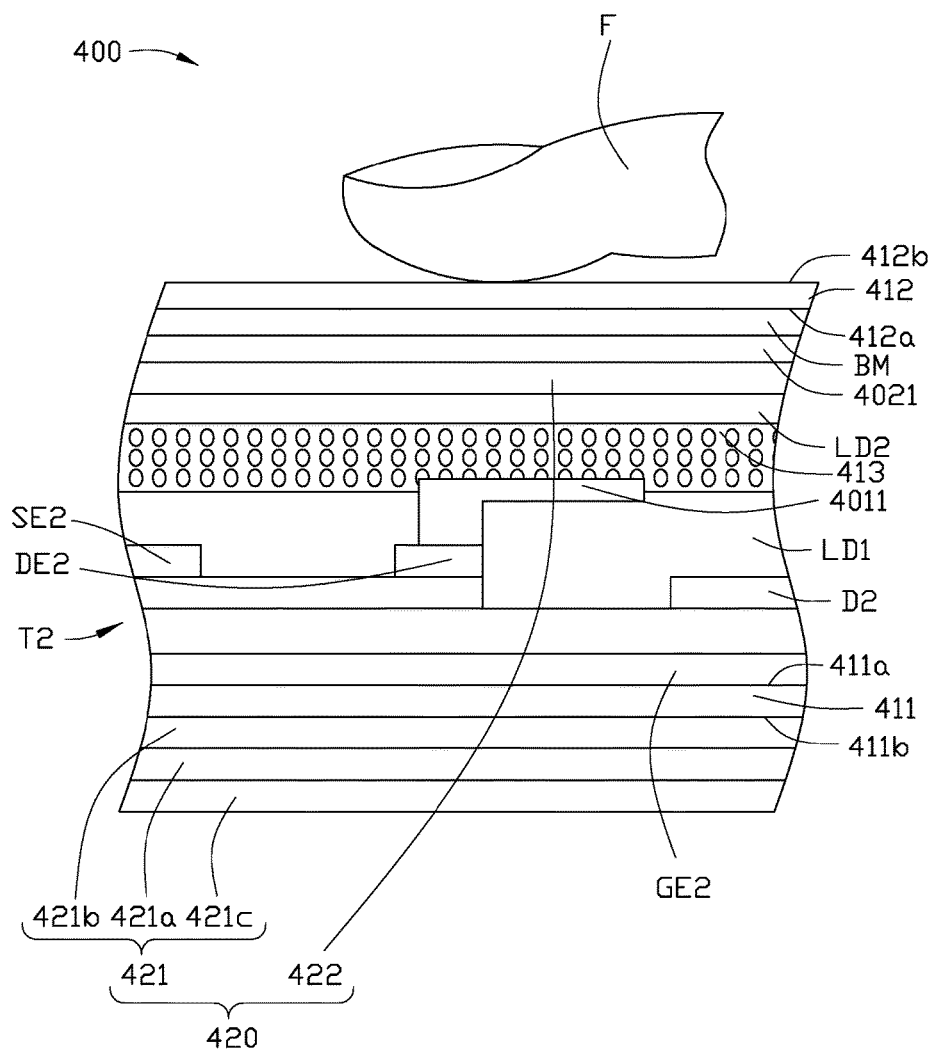
FIG. 13 is cross-sectional view of the fourth embodiment of the dummy pixel unit of FIG. 4.

FIG. 13 illustrates a fourth embodiment of the dummy pixel unit Pb in the non-display region B of the display apparatus 400. The dummy pixel units Pb transmit fingerprint signals when a fingertip is pressed against the screen, and are not used to display images.

Each of the dummy pixel units Pb includes at least one second switch T2, a first auxiliary electrode 4011, and a second auxiliary electrode 4021. The structure of the second switch T2 is the same as the structure of the first switch T1. The second switch T2 includes a second gate electrode GE2 located on the first surface 411a, a semiconductor layer (not labeled), a second source electrode SE2, and a second drain electrode DE2. The second gate electrode GE2 is electrically connected to the second scan line Gb. The second drain electrode DE2 is electrically connected to the first auxiliary electrode 4011. The first auxiliary electrode 4011 is disposed on the second switch T2 and the first insulation layer LD1.

A shield layer BM and a second insulation layer LD2 are laid on the third surface 412a in that sequence. The second insulation layer LD2 is disposed on the first auxiliary electrode 4011 for protecting the first auxiliary electrode 4011. The second auxiliary electrodes 4021 are disposed below the second insulation layer LD2. The shield layer BM shields against light. In at least one embodiment, the shied layer BM is made of black resin, Cr, or chromium oxide material.

A fingerprint identification module 420 is provided in the non-display region B. The fingerprint identification module 420 includes a signal transmitting layer 421 and a plurality of signal receiving components 422. The signal transmitting layer 421 is disposed on the second surface 411b of the first substrate 411, and the signal receiving components 422 are positioned at a side of the first substrate 411 adjacent to the first surface 411a. The signal transmitting layer 421 generates ultrasonic wave. The signal transmitting layer 421 includes a signal transmitting portion 421a, a first conductive portion 421b, and a second conductive portion 421c. The first conductive portion 421b cooperates with the second conductive portion 421c to generate the ultrasonic waves based on a voltage difference existing between the first conductive portion 421b and the second conductive portion 421c. In at least one embodiment, the signal transmitting portion 421a is sandwiched between the first conductive portion 421b and the second conductive portion 421c. The first conductive portion 421b is disposed on the second surface 411b and the second conductive portion 421c is disposed on the signal transmitting portion 421a.

The signal receiving component 422 receives the reflected ultrasonic waves, converts them into fingerprint identification signal Dt, and transmits the signal to the first auxiliary electrode 4011. The signal receiving component 422 is formed on a surface of the second auxiliary electrode 4021 opposite to the second insulation layer LD2. In at least one embodiment, the signal receiving component 422 is made of one of polyvinylidene fluoride (PVDF), polyvinylidene fluoride-trifluoroethylene (PVDF-TrFE), a piezoelectric transducer (PZT), or an electrostatic transducer.

Since the structure of the signal receiving component 422 is located upon the second auxiliary electrode 4021, damage to the signal receiving component 422 is reduced while manufacturing the first substrate 411 and the second substrate 412 at a high temperature, and display performance of the signal receiving component 422 is improved.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A display apparatus with a display region and a non-display region surrounding the display region, the display apparatus comprising:
    a first substrate;
    a second substrate;
    a liquid crystal layer sandwiched between the first substrate and the second substrate;
    a plurality of data lines;
    a plurality of dummy pixel units located in the non-display region, and each of the dummy pixel units comprising:
        at least one first auxiliary electrode in the non-display region;
        at least one second auxiliary electrode located upon the at least one first auxiliary electrode and in the non-display region;
    a fingerprint identification module located in the non-display region, and the fingerprint identification module comprising:
        a signal transmitting layer located between the first substrate and the second substrate, and configured to generate ultrasonic wave;
        a plurality of signal receiving components located upon the signal transmitting layer and at a side of the liquid crystal layer away from the first substrate, and configured to receive the ultrasonic wave reflected by an object on the non-display region and transfer the received ultrasonic wave into fingerprint signals; and
    a plurality of data extending lines extending from the plurality of data lines and disposed between the first substrate and the second substrate, and configured to electrically connect with the corresponding dummy pixel unit;
    wherein the signal receiving components further transmit the fingerprint signals to the at least one first auxiliary electrode; the data extending lines receive the fingerprint signals from the at least one first auxiliary electrode; the at least one first auxiliary electrode and the at least one second auxiliary electrode locating at opposite sides of the liquid crystal layer; the at least one first auxiliary electrode, the liquid crystal layer, and the at least one second auxiliary electrode cooperate to form capacitors; each of the at least one first auxiliary electrode is located at a side of one of the plurality of signal receiving components adjacent to the liquid crystal layer.

2. The display apparatus of claim 1, further comprising a plurality of display pixel units in the display region and a plurality of data lines electrically connected with the display pixel units respectively; wherein each of the display pixel units comprises at least one first electrode and at least one second electrode; the at least one first electrode receives an image data signal from the corresponding data line; the at least one first electrode and the corresponding second electrode cooperate with each other to drive liquid crystals in the liquid crystal layer to rotate; each of the data extending line is electrically connected to the corresponding data line.

3. The display apparatus of claim 2, wherein the data extending lines transmit the image data signal and the fingerprint signals in turn.

4. The display apparatus of claim 2, further comprising a scan circuit connected to the display pixel units by a plurality of first scan lines and connected to the dummy pixel units by a plurality of second scan lines respectively, wherein the scan circuit generates a first scan signal to the display pixel units in a display period, and generates a second scan signal to the dummy pixel units in a fingerprint identification period; the second scan signal controls the at least one first auxiliary electrode to receive the fingerprint signal.

5. The display apparatus of claim 4, wherein each of the display pixel units further comprises a first switch; the first switch turns on based on the first scan signal, and the at least one first electrode receives the image data signal from the data line.

6. The display apparatus of claim 4, wherein each of the dummy pixel units further comprises a second switch, the second switch turns on based on the second scan signal, and the at least one first auxiliary electrode receives the fingerprint signals from the data extending line.

7. The display apparatus of claim 4, wherein the at least one second auxiliary electrode receives a voltage for determining a voltage difference between reflected ultrasonic waves in the fingerprint identification period.

8. The display apparatus of claim 1, wherein the at least one second auxiliary electrode is insulated from the liquid crystal layer.

9. The display apparatus of claim 8, wherein the at least one first auxiliary electrode is sandwiched between the liquid crystal layer and the corresponding signal receiving component.

10. The display apparatus of claim 1, wherein the signal receiving components are located upon the at least one second auxiliary electrode and is sandwiched between the at least one second auxiliary electrode and the liquid crystal layer.

* * * * *